(12) United States Patent
Swami et al.

(10) Patent No.: US 8,323,378 B2
(45) Date of Patent: Dec. 4, 2012

(54) OXYGEN SUPPLY METHOD AND APPARATUS

(75) Inventors: Sadashiv Swami, Tonawanda, NY (US); Philip A. Barrett, Tonawanda, NY (US); Richard Martin Kelly, Buffalo, NY (US)

(73) Assignee: Praxair Technology, Inc., Danbury, CT (US)

( * ) Notice: Subject to any disclaimer, the term of this patent is extended or adjusted under 35 U.S.C. 154(b) by 303 days.

(21) Appl. No.: 12/769,030

(22) Filed: Apr. 28, 2010

(65) Prior Publication Data

US 2011/0265644 A1  Nov. 3, 2011

(51) Int. Cl.
*B01D 53/22* (2006.01)
*B01D 53/047* (2006.01)
*A61M 16/00* (2006.01)
*A61M 16/12* (2006.01)
*A62B 7/00* (2006.01)

(52) U.S. Cl. ........... 95/22; 95/19; 95/45; 95/54; 95/138; 96/4; 96/108; 96/113; 96/421; 128/204.18; 128/204.21; 128/205.24; 137/592; 222/464.1

(58) Field of Classification Search ............... 96/4, 108, 96/113, 421; 95/19, 22, 45, 54, 138; 128/204.18, 128/204.21, 205.24; 137/590, 592; 222/464.1
See application file for complete search history.

(56) References Cited

U.S. PATENT DOCUMENTS

| | | | |
|---|---|---|---|
| 3,770,621 A | 11/1973 | Collins et al. | |
| 4,734,273 A | 3/1988 | Haskell | |
| 5,804,155 A | 9/1998 | Farrauto et al. | |
| 6,113,673 A | 9/2000 | Loutfy et al. | |
| 6,468,328 B2 | 10/2002 | Sircar et al. | |
| 6,652,626 B1 | 11/2003 | Plee | |
| 6,681,589 B2 | 1/2004 | Brudnicki | |
| 7,077,133 B2 * | 7/2006 | Yagi et al. | 128/204.26 |
| 7,396,442 B2 | 7/2008 | Bagby et al. | |
| 2004/0042944 A1 | 3/2004 | Sehlin et al. | |
| 2005/0137810 A1 * | 6/2005 | Esposito, Jr. | 702/32 |
| 2006/0062707 A1 * | 3/2006 | Crome et al. | 422/305 |
| 2007/0039466 A1 * | 2/2007 | Nawata et al. | 95/96 |
| 2008/0000353 A1 * | 1/2008 | Rarig et al. | 95/100 |
| 2011/0132367 A1 * | 6/2011 | Patel | 128/204.22 |

FOREIGN PATENT DOCUMENTS

WO  WO 2007/060141 A1  5/2007

OTHER PUBLICATIONS

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

* cited by examiner

*Primary Examiner* — Jason M Greene
(74) *Attorney, Agent, or Firm* — David M. Rosenblum (57) ABSTRACT

A method and apparatus for supplying oxygen to meet a user demand in which oxygen is separated from air by an electrically driven oxygen separation device to supply oxygen to meet the user demand and to charge an adsorbent bed with all or part of the separated oxygen. When a user demand exists, oxygen can be supplied from both the electrically driven oxygen separation device and from oxygen desorbed from the adsorbent bed.

11 Claims, 3 Drawing Sheets

OXYGEN SUPPLY METHOD AND APPARATUS

FIELD OF THE INVENTION

The present invention relates to a method and apparatus for supplying oxygen in which the oxygen is separated from air with the use of an electrically driven oxygen separation device in which the oxygen is separated from air through oxygen ion transport in an ionic conductor. More particularly, the present invention relates to such a method and apparatus in which the separated oxygen is stored in an adsorbent so that the oxygen may be supplied from both the adsorbent and the electrically driven oxygen separation device.

BACKGROUND OF THE INVENTION

Oxygen can be separated from air with the use of electrically driven oxygen separation devices. Such devices employ a membrane element having an electrolyte such as yttria stabilized zirconia that is sandwiched between a cathode electrode and an anode electrode and current collectors situated at the outer surfaces of the electrodes for applying an electric potential across the electrodes and therefore, the electrolyte. When the membrane is heated to a temperature at which oxygen ion transport can occur and the electric potential is applied to the electrodes, air contacting the cathode electrode will ionize into oxygen ions and will be transported to the anode electrode. At the anode electrode, the oxygen ions will recombine into oxygen molecules that can be collected to produce an oxygen product. Such devices have particular use for industrial applications in which ultra-high purity oxygen is required.

Although there are many forms of such devices, typically the membrane element has a layered structure employing electrolyte, electrode and current collector layers in the form of a flat plate or tube. Additionally, the membrane elements are connected by means of a manifold to collect the oxygen separated by the use of the membrane elements. The assembly can be housed within an electrically heated enclosure to heat the membranes to their operational temperature. The air is supplied to the enclosure to contact the membrane elements. For example, where tubular forms of the membrane elements are used, the tubes can be connected to a manifold and the air introduced into the heated enclosure by means of a blower or the like contact the outer surface of tubes. The separated oxygen will collect within the tubes and will be discharged from the heated enclosure through an outlet conduit connected to the manifold.

As indicated above, electrically driven oxygen separation devices have particular application where the supply of ultra-high purity oxygen is required. Potential applications include use in combustion analyzers to perform elemental analysis, use a process gas in micro-electronics fabrication, and use a purge gas in laser cutting. In such applications, the oxygen requirement will vary and when the facility is closed, there will be no requirement for the oxygen. However, it is very expensive to design such a separation device with varying oxygen flow rates that meet oxygen demand for broad customer applications. In fact, in most cases, the user will require higher oxygen flow rates for short periods of time, for example, five to eight hours. Although such oxygen separation devices can be designed to supply the oxygen at varying oxygen flow rates, the oxygen separator will be very expensive and in most cases under utilized. It is far more practical to design the oxygen separation device with a fixed oxygen flow rate for example, 0.5, 1.0, 1.5 or 2.0 standard liters per minute that operates continuously, seven days a week. Such a design will increase the utilization of the oxygen separation device while maintaining fabrication costs at a more practical lower level.

The problem with designing an oxygen separation device with a fixed low output, as has been described above, is that sufficient oxygen back up volume must also be supplied so that customer can withdraw oxygen at a high flow rate (greater than generation rate) during times of peak utilization of the device. However, oxygen storage is a challenging proposition due to the fact that operating pressure of an oxygen separation device is typically very low. To provide significant oxygen back up volume, the oxygen therefore needs to be compressed for storage in a small vessel or by provision of an additional large surge tank. Both these options have inherent disadvantages. For example, the cost of an oxygen compressor can be much higher than the oxygen separation device itself and is commercially prohibitive given the alternative of supplying the oxygen from gas cylinders. Surge tanks are less expensive compared to compressors but it takes valuable space which is of prime importance in laboratories. Moreover, in order to provide sufficient back up volume in a surge tank, the oxygen must be stored at very high pressures, for example above 500 psig. However, operating tubular membrane elements at high pressure increases tube hoop stresses within such elements leading to possible failure. Also, electrode oxidation and current collector densification can become severe at such very high pressures.

As will be discussed, the present invention provides an oxygen supply method and apparatus that employs an electrically driven oxygen separation device in a more practical and efficient manner than that contemplated in the prior art outlined above.

SUMMARY OF THE INVENTION

In one aspect, the present invention provides a method of supplying oxygen to meet a user demand. In accordance with this aspect of the present invention, the oxygen is separated from air through oxygen ion transport within an electrically driven oxygen separation device to produce a separated oxygen stream. At least part of the oxygen contained within the separated oxygen stream is stored by introducing at least part of the separated oxygen stream into an adsorbent bed. The oxygen is supplied by separating the oxygen from the air within an electrically driven oxygen separation device to produce the separated oxygen stream, discharging an adsorbent bed oxygen stream from the adsorbent bed containing the oxygen previously stored within the adsorbent bed and combining at least a remaining part of the separated oxygen stream with the adsorbent bed oxygen stream to form a combined oxygen stream from which the oxygen is supplied to meet the user demand for the oxygen.

In such manner, the oxygen separation device itself can be designed with a low nominal production rate for the oxygen. As will be discussed, during periods of low demand that would include periods in which there is no demand, such as at night, the oxygen separation device will store all or part of the oxygen generated in the adsorbent bed, so that during peak periods of demand, adsorbent bed oxygen and the generated oxygen are available to meet the demand. Since an adsorbent bed is used that contains an adsorbent, there is no need to compress the oxygen or to store the oxygen at a lower pressure within a surge tank to meet such demand. Moreover, the use of an adsorbent bed that consists of an adsorbent vessel that contains an adsorbent allows more oxygen to be stored in a smaller tank to meet user demand.

In a particular embodiment, during an initial period of supply of the oxygen, the oxygen is supplied solely from the adsorbent bed oxygen stream and during such period, pressure within the adsorbent bed continually decreases and the electrically driven oxygen separation device is in a deactivated state and is not producing the oxygen. At a subsequent period of the supply of the oxygen, that commences when the pressure within the adsorbent bed decreases to a lower predetermined pressure level, the oxygen separation device is activated to produce the separated oxygen stream and during the subsequent period the user demand can be less than, equal to or greater than the rate at which the oxygen is able to be produced by the electrically driven oxygen separation device. In this regard, if the user demand is less than the rate at which the oxygen is able to be produced by the electrically driven oxygen separation device, the part of the separated oxygen stream is introduced into the adsorbent bed to store part of the oxygen contained in the separated oxygen stream within the adsorbent bed and the remaining part of the separated oxygen stream is supplied to the user to meet the user demand. During the introduction of the part of the separated oxygen stream into the adsorbent bed, the pressure within adsorbent bed continually increases and when the pressure within the adsorbent bed increases to a higher predetermined pressure level that is higher than the lower predetermined pressure level, the oxygen separation device is returned to the deactivated state. If the user demand is substantially equal to the rate at which the oxygen is produced by the electrically driven oxygen separation device, the oxygen is supplied solely from the separated oxygen stream and not from the adsorbent bed oxygen stream. If the user demand is greater than the rate at which the oxygen is produced by the electrically driven oxygen separation device, the oxygen is supplied from the combined stream where the combined stream is formed from the adsorbent bed oxygen stream and all of the separated oxygen stream. If there is no user demand for the oxygen and the pressure within the adsorbent bed is at or below the lower predetermined pressure level, the electrically driven oxygen separation device is activated and all of the separated oxygen stream is introduced into the adsorbent bed until the higher predetermined pressure level is reached and the electrically driven oxygen separation device is returned to the deactivated state.

In another embodiment, the user demand can alternate between periods in which no user demand exists and a user demand exists for the oxygen. In such case, when no user demand exists and pressure within the adsorbent bed is below a predetermined level, the electrically driven oxygen separation device is activated and all of the separated oxygen stream is introduced into an adsorbent bed. When pressure within the adsorbent bed reaches a predetermined level, the electrically driven oxygen separation device is deactivated. When the user demand exists, the electrically driven oxygen separation device is activated and the oxygen is supplied to the user from the combined stream wherein the combined stream is formed from all of the adsorbent bed oxygen stream and the separated oxygen stream.

In any embodiment of the present invention, the electrically driven oxygen separation device and the adsorbent vessel are contained within a system to deliver the oxygen and oxygen is supplied by a back-up supply of the oxygen upon the system failing to meet user demand for the oxygen. Furthermore, the oxygen pressure of the oxygen that is delivered to meet the user demand can be regulated to a level below that of the adsorbent bed oxygen stream and the separated oxygen stream.

In another aspect the present invention provides an apparatus for supplying oxygen to meet a user demand. In such aspect, an electrically driven oxygen separation device is configured to separate the oxygen from air through oxygen ion transport and thereby to produce a separated oxygen stream. An adsorbent bed is provided that contains an adsorbent. A flow network connects the electrically driven oxygen separation device to the adsorbent bed such that at least part of the separated oxygen stream is introduced into the adsorbent bed and at least part of the oxygen contained in the separated oxygen stream is stored in the adsorbent bed. The flow network has an outlet in flow communication with both the adsorbent bed and the electrically driven oxygen separation device such that the oxygen is able to be supplied from the outlet as a combined stream composed of at least a remaining part of the separated stream produced by the electrically driven oxygen separation device and an adsorbent bed oxygen stream produced from the oxygen previously stored within the adsorbent bed to meet the user demand for the oxygen.

In one embodiment, a control system is provided that is responsive to pressure within the adsorbent bed and is configured such that when the pressure is at a lower pressure level, the electrically driven oxygen separation device is activated to produce the separated oxygen stream and when the pressure is at a higher pressure level, higher than the lower pressure level, the electrically driven oxygen separation device is deactivated and is in a deactivated state in which the separated oxygen stream is not produced. The flow network has at least one check valve positioned to prevent flow from the adsorbent bed to the electrically driven oxygen separation device such that when the user demand exists, and the pressure is at the higher pressure level, the oxygen supplied from the outlet consists solely of the adsorbent bed oxygen stream until the pressure within the adsorbent bed has decreased to the lower pressure level whereupon the electrically driven oxygen separation device is activated and thereafter the oxygen is supplied based upon the user demand. If the user demand is less than a flow rate of the separated oxygen stream, the oxygen supplied from the outlet consists of the remaining part of the separated oxygen stream and the part of the oxygen stream is supplied to the adsorbent bed. If user demand is equal to the flow rate of the separated oxygen stream, the oxygen supplied from the outlet consists of all of the separated oxygen stream and if user demand is greater than the flow rate of the separated oxygen stream the oxygen supplied from the outlet consists of the combined stream.

In another embodiment, the control system is responsive to pressure within the adsorbent bed and is configured such that when the pressure is at a lower pressure level, the electrically driven oxygen separation device is activated to produce the separated oxygen stream and when the pressure is at a higher pressure level, higher than the lower pressure level, the electrically driven oxygen separation device is deactivated and is in a deactivated state in which the separated oxygen stream is not produced. The flow network has at least one first check valve to prevent flow from the adsorbent bed to the electrically driven oxygen separation device and two parallel flow paths which are counter flow to each other. One of the two parallel flow paths, at one end, is in flow communication with the adsorbent bed and, at the other end, is in flow communication with the electrically driven oxygen separation device and the other of the two parallel flow paths, at one end, is in flow communication with the adsorbent bed and, at the other of the ends, is in flow communication with the outlet. One of the two parallel flow paths has a second check valve positioned to prevent flow from the adsorbent bed to the electrically driven oxygen separation device and the other of the two flow paths has a third check valve preventing flow from the electrically driven oxygen separation device to the adsorbent bed such that when the electrically driven oxygen separation device is activated at the lower pressure level, the separated oxygen stream will flow to the adsorbent bed through the one of the two flow paths. The flow network is also provided with a pressure regulator positioned within the other of the two flow paths, between the third check valve and the adsorbent bed and is configured to reduce line pressure of the adsorbent bed oxygen stream so that the adsorbent bed oxygen stream is able to combine with the separated oxygen stream. The control system is also configured to selectively activate the electrically driven oxygen separation device when the pressure is at the higher pressure level and a user demand exists such that the oxygen delivered from the outlet of the flow network consists of the combined stream consisting of adsorbent bed oxygen stream flowing through the other of the two flow paths to the outlet and the separated oxygen stream flowing from the electrically driven oxygen separation device to the outlet.

In any embodiment, an outlet pressure regulator can be connected to the outlet to regulate oxygen pressure of the oxygen delivered from the outlet to a level below that of the adsorbent bed oxygen stream and the separated oxygen stream. Additionally, a backup supply system can be provided having an oxygen cylinder connected to the outlet. The backup supply system is configured to deliver oxygen from the oxygen cylinder when the level of the oxygen pressure falls below a predetermined pressure level. Also, in any embodiment of the present invention, the adsorbent can be a zeolite selected from the group comprising 5A, CaNaX, CaX, LiX or mixtures thereof.

Additionally, in any embodiment, the adsorbent bed can be provided with an adsorbent vessel to contain the adsorbent. A piping tee having a base section is attached to the adsorbent vessel, the base section of the piping tee having a side opening. An elongated dip tube extends through the base section into the adsorbent vessel such that an annular space is defined between the elongated dip tube and the base section. The annular space is in communication with the side opening of the base section. The dip tube and the side opening are connected to the flow network such that either the separated oxygen stream flows into the dip tube and the adsorbent vessel and the adsorbent bed oxygen stream flows through the annular space and out of the side opening into the flow network or the separated oxygen stream flows into the side opening, through the annular space and into the adsorbent vessel and the adsorbent bed oxygen stream flows through the dip tube to the flow network.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
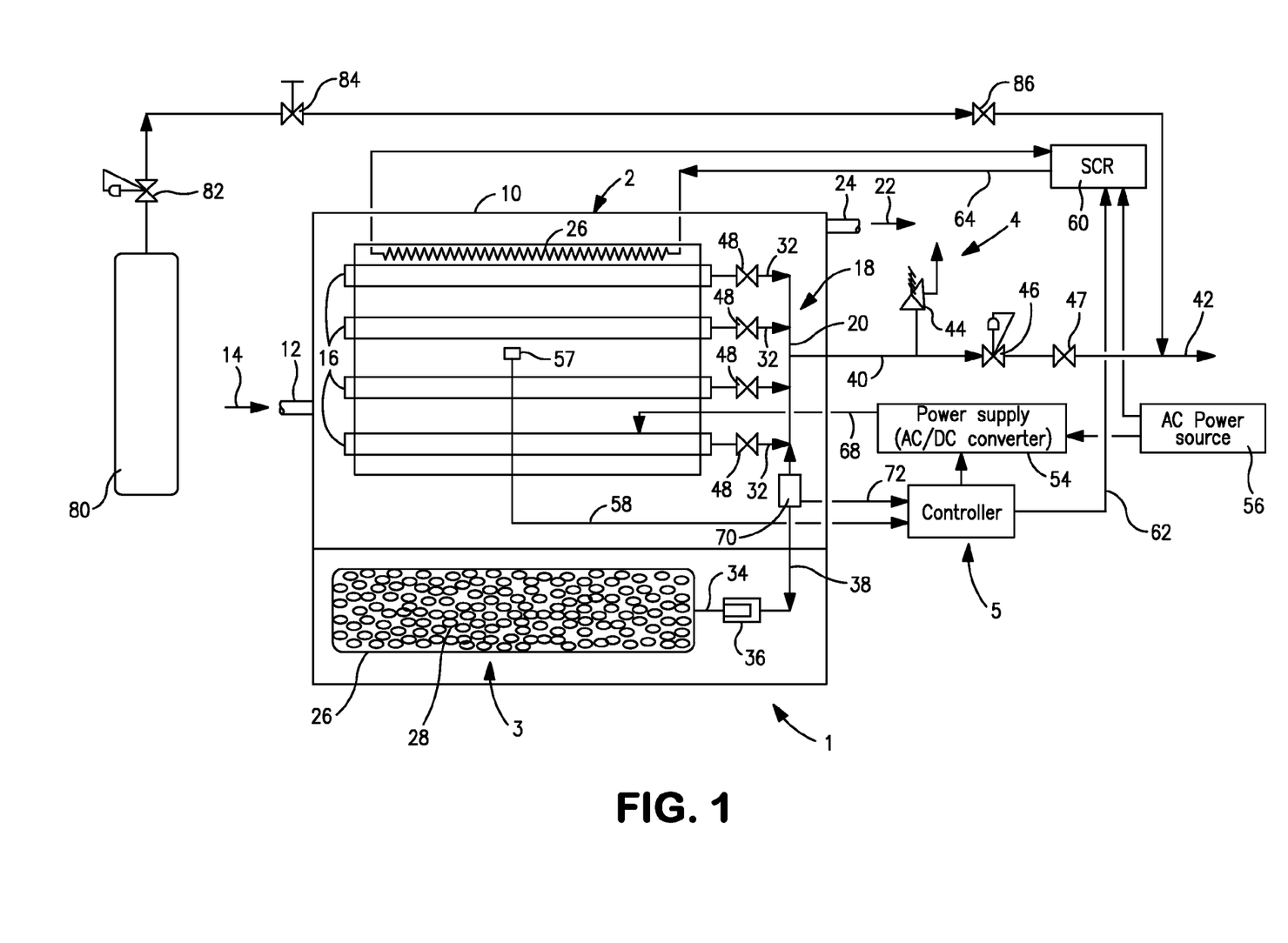
FIG. 1 is a schematic diagram of an apparatus for carrying out a method in accordance with one embodiment of the present invention.

With reference to FIG. 1 an apparatus 1 is illustrated for supplying oxygen to meet a user demand. The user demand could be in accordance with the requirements of a person using apparatus 1 or from a machine that is connected to apparatus 1. Apparatus 1 generally consists of an electrically driven oxygen separation device 2, an adsorbent bed 3, a flow network 4 and a controller 5 that controls the operation of the electrically driven oxygen separation device 2.

It is to be noted that no particular form of the electrically driven oxygen separation device is preferred. However, electrically driven oxygen separation device 2 consists of an insulated enclosure 10 having an inlet 12 to receive an air stream 14. Housed within insulated enclosure 10 is an array of oxygen separation elements 16 that are in the form of closed end tubes and that as known in the art consist of an outer cathode electrode layer that can be Lanthanum Strontium Manganate (LSM), an electrolyte layer that can be Zirconium, an inner anode electrode layer that can be Lanthanum Strontium Manganate (LSM) and current collector layers that can be Silver. When the oxygen separation elements 16 are heated to an operational temperature of typically about 675° C. and an electric potential is applied to the inner and outer current collector layers, the oxygen within the air will ionize and oxygen ions will be conducted through the electrolyte in a direction from the cathode electrode layer to the anode electrode layer. The oxygen is collected within a manifold 18 and discharged through a conduit 20 as a separated oxygen stream. Conduit 20 forms part of the manifold 18. A retentate stream 22 composed of oxygen depleted air is discharged from an outlet 24. Although not illustrated, the incoming air stream 14 could be motivated through the insulated enclosure 10 by means of a blower. Electrical heating elements 26 are provided within the insulated enclosure 10 to heat the oxygen separation elements 16 up to their operational temperature at which oxygen ions will be conducted through the electrolyte thereof. Preferably, in order to take full advantage of the present invention, electrically driven oxygen separation device is designed in a manner well known to those skilled in the art to produce the separated oxygen at a pressure between about 200 psig and about 500 psig.

Adsorbent bed 3 consists of an adsorbent vessel 26 in the form of a gas cylinder that is filled with adsorbent 28. Adsorbent vessel 26 can be a Medical D or E cylinder that has been suitably approved for use in pressure vessel service. Also, adsorbent vessel 26 could be any ASME graded pressure vessel. Adsorbent vessel 26 is preferably housed within a housing 30 that supports the electrically driven oxygen separation device 2 so that the assemblage occupies a minimum footprint. This being said, the electrically driven oxygen separation device 2 and the adsorbent bed 3 could be in separate enclosures. Moreover, although only a single adsorbent bed 3 is illustrated, a series of such adsorbent beds could be connected in parallel or series. The adsorbent bed 3 adsorbs oxygen separated by electrically driven oxygen separation device 2 so that, as will be discussed, oxygen can be supplied to meet user demand from both the electrically driven oxygen separation device 2 and adsorbent bed 3 at flow rates that exceed the capabilities of electrically driven oxygen separation device 2 alone.

The adsorbent 28 is preferably formed from zeolites, for example, 5A, CaNaX, CaX, LiX or mixtures thereof. Such materials will enable more oxygen to be stored within adsorbent vessel 26 as compared to an unfilled cylinder at similar operating conditions of temperature and pressure.

Carbon molecular sieves, activated carbon, fullerene based materials also exhibit similar properties and in some instances, such materials have more oxygen storage capacity compared to zeolite material. In theory, any material having good adsorption capacity for oxygen can be used as adsorbent for oxygen storage. However, some materials, especially those that are carbon based, are not compatible with oxygen due to their flammability potential. Zeolite adsorbents, such as discussed above, are inexpensive and show compatibility with oxygen. However, in instances where higher storage density is required, a carbon based material could be used (provided that the material was compatible with oxygen at that operating condition).

As temperature is lowered, zeolite adsorbents show enhanced oxygen storage capacity. However, it is economically not feasible to create low temperature conditions in the apparatus 1. The ultra high pure oxygen produced by the electrically driven oxygen separation device 2 is at very high temperature, but by the time it reaches the adsorbent bed 3, it almost equilibrates with room temperature. Therefore, any material showing higher oxygen storage capacity at room temperature can be used as adsorbent. In this regard, the enclosure housing the adsorbent bed 3 should be capable of dissipating the heat of adsorption and taking up heat from the surroundings in order to help with the desorption. In addition to the oxygen storage capacity of the material, there are few other factors which determine the oxygen storage density. These factors include accessible surface area, void space, and binder material and content used during manufacturing of beads of the adsorbent as well as any other additives, such as processing additives which are not removed at the end of manufacturing. Materials with higher bulk density have more oxygen storage capacity, therefore, such materials are preferred. Typically, the binder material does not have ability to store oxygen and thus reduces the overall oxygen storage capacity. Thus, an adsorbent without or having a minimum binder content is also preferred. It is to be noted that other geometries are possible such as extrudates and pellets. In terms of size of the adsorbent particles, any size and/or distribution of particles which can be retained inside the adsorbent vessel and which when packed appropriately, achieves a greater oxygen working capacity than the empty vessel when charged and discharged with oxygen under the same pressure and temperature conditions, may be used.

The oxygen storage capacity of the zeolite adsorbent is significantly affected by presence of moisture. Some residual moisture is present in the adsorbent after it is manufactured. Therefore, it is important to select an adsorbent with a low residual moisture content, less than 1.0, preferably less than 0.5 weight percent. Also, there is possibility of moisture being entrapped on sieves during loading the cylinder with adsorbent. Therefore, utmost care needs to be taken to avoid contact of the sieves with moisture. This problem could be avoided by loading the cylinder with adsorbent beads under a dry gas atmosphere, for example, a nitrogen atmosphere using glove box. It is to be noted, however, that the use of a nitrogen atmosphere introduces another impurity, namely, nitrogen into the adsorbent bed 3. Nitrogen does not significantly reduce the oxygen storage capacity of zeolite, but it has a tendency to strongly adhere to zeolite bed. The oxygen being generated by the electrically driven oxygen separation device is of ultra-high purity and, therefore, even parts per million levels of nitrogen in the product gas will not be acceptable. As well known to persons skilled in the art, the nitrogen can be effectively removed from the adsorbent 28 by either subjecting the adsorbent bed 3 to an evacuation and oxygen pressurization cycle, or subjecting the adsorbent bed 3 to a cycle of pressurization and depressurization at elevated temperature, or loading the adsorbent vessel 26 with the adsorbent 28 in an oxygen atmosphere. Although only one adsorbent bed 3 is shown, as would occur to those skilled in the art, depending on the size of apparatus 1, multiple adsorbent beds connected in parallel or series could be used.

Flow network 4 consists of the manifold 18 that is formed by the conduit 20 and outlet conduits 32 communicating between conduit 20 and oxygen separation elements 16 to receive streams of the separated oxygen. Conduit 20 is also connected to adsorbent bed 3 by way of an outlet conduit 34 that has a filter element 36 to prevent particulates composed of the adsorbent 28 from being discharged with the adsorbent bed oxygen and a conduit 38. In this regard, when electrically driven oxygen separation device 2 is activated, the separated oxygen will flow through the outlet conduits 32 to the conduit 20 and then through conduits 38 and 34 to the adsorbent bed 3 where the oxygen will be stored in the adsorbent bed. In this regard, a major fraction of the oxygen being stored will adsorb on the adsorbent 28 and a remaining fraction will be stored in interstitial spaces between adsorbent particles. When a user demand for oxygen exists, an adsorbent bed oxygen stream will flow through outlet conduit 34 and conduit 38 and also, as will be discussed, potentially the separated oxygen stream flowing through outlet conduits 32 to conduit 20. The adsorbent bed oxygen stream during such time is produced from oxygen previously stored within the adsorbent vessel 26 by desorption of oxygen from the adsorbent 28 and residual pressurized oxygen contained within the adsorbent vessel 26. The resulting combined stream of the adsorbent bed oxygen and separated oxygen will combine in outlet conduit 40 and flow out of the outlet 42 of the apparatus 1 to the user. A safety relief valve 44 is provided to vent overpressures of oxygen and where required for a particular application a pressure regulator 46 to reduce the pressure of the combined stream flowing through outlet conduit 40. A check valve 47 is provided to prevent backflow from the user to the apparatus 1 that could contaminate such apparatus.

During any delivery of adsorbent bed oxygen from adsorption bed 3, flow back to the electrically driven oxygen separation device 2 is prevented by check valves 48. As could be appreciated, if conduit 20 were separately connected to outlet conduit 40, then only a single check valve upstream of the connection would be required. However, the use of multiple check valves 48 also serves to isolate each of the oxygen separation elements 16 in case of failure of any one of such elements.

The oxygen separation elements 16 are heated to an operation temperature by means of heating elements 26 that would be located within enclosure 10. Electrical power to heating elements 26 is supplied by a direct current power supply 54 that converts alternating current from an alternating current power source 56 to direct current. A thermocouple 57 is connected to controller 5 by means of an electrical connection 58. An input to controller 5 is a set point temperature. The controller 5 is in turn connected to a silicon controlled rectifier 60 ("SCR") by way of an electrical connection 62. The thermocouple 57 continually transmits a signal referable to temperature within insulated enclosure 10. When such temperature falls below the set point, the controller 5 activates the silicon controlled rectifier 60 to apply power to the heating elements 26 by means of an electrical connection 64. The silicon controlled rectifier 60 is powered using AC power source 56. If the temperature within the insulated enclosure 10 rises above the set point temperature, controller 5 operates to deactivate the silicon controlled rectifier 60 and therefore the power supplied to heating elements 26.

Controller 5 also is programmed to control the operation of oxygen separation elements 16. As mentioned above, power is applied to oxygen separation elements 16 by means of power supply 54 that is connected to oxygen separation elements 16 by means of an electrical connection 68. In this regard, the oxygen separation elements 16 can be connected in electrical series. The power supply 54 is activated by controller 5 in response to pressure measured within outlet conduit 34 by a pressure transducer 70 connected to controller 5 by means of an electrical connection 72 for transmission of a signal referable to the pressure within outlet conduit 34 and therefore within the adsorbent vessel 26 of adsorbent bed 3.

With respect to the operation of electrically driven oxygen separation device 2, the controller 5 is programmed with a lower set point pressure, for example 230 psig and a higher set point pressure 250 psig. The controller 5 is also programmed to activate the power supply 54 whenever the pressure as sensed by pressure transducer 70 falls below 230 psig and to deactivate the power supply 54 when pressure reaches 250 psig. As a consequence, when a user demand exists, the oxygen is supplied by adsorbent bed oxygen as a adsorbent bed oxygen stream through outlet conduit 34, conduit 38, conduit 20 of manifold 18 and then through outlet conduit 40 to the outlet 42. The check valves 48 prevent oxygen flow back into the oxygen separation elements 16. Flow continues from adsorbent bed 3 until the 230 psig level is reached and then power supply 54 is activated along with oxygen separation elements 16 to separate the oxygen from incoming air stream 14. Oxygen separation elements 16 will continue to supply oxygen until the pressure again reaches 250 psig. This pressure will be obtained when customer demand for the supply of oxygen either is less than that capable of being supplied from electrically driven oxygen separation device 2 or is nonexistent.

By way of example, assuming that electrically driven oxygen separation device 2 is capable of providing about 2 standard liters per minute of oxygen and also that the customer demand will vary between less than 2 standard liters per minute of oxygen up to about 4 standard liters per minute, the customer demand will be less than or greater than the oxygen supply rate of the oxygen that device 2 is capable of delivering. In this regard, if customer demand is greater than that able to be supplied by electrically driven oxygen separation device 2, above 2 standard liters per minute, although the oxygen will initially be supplied from adsorbent bed 3, when the pressure of 230 psig is reached, as sensed by pressure transducer 70, the electrically driven oxygen separation device 2 will be activated by controller 5 and then, the oxygen will be supplied as a combined stream formed from the separated stream of oxygen produced by electrically driven oxygen separation device 2 and the adsorbent bed oxygen stream produced by adsorbent bed 3. If the customer demand were equal to the output of electrically driven oxygen separation device 2, for instance, 2 standard liters per minute, then the oxygen will be supplied solely from the separated oxygen stream. Assuming that the customer demand is less than the oxygen capable of being delivered from oxygen separation device 2, then the oxygen will be supplied from part of the separated oxygen stream and the other part of the separated oxygen stream will be introduced into adsorbent bed 3 to be adsorbed in the adsorbent 28. When no demand exists, then all of the separated oxygen stream will be introduced into adsorbent bed 3. In either a case of customer demand that is below that capable of being met by electrically driven oxygen separation device or no demand, power supply 54 will only be deactivated when the pressure sensed by pressure transducer 70 reaches the higher set point pressure, for example 250 psig.

The choice of pressure range depends on shape of adsorption isotherm and operating pressure limits on electrically driven oxygen separation device 2. Also, the choice of pressure range depends on customer requirement when apparatus 1 is deployed at customer location. For example, where customer requirements dictate a minimum of 50 psig oxygen pressure for the end user application, adsorbent vessel 26 must be sized in appropriate way to provide sufficient oxygen back-up volume so that pressure never falls below 50 psig. The higher pressure, for example 250 psig, is selected based on shape of adsorption isotherm to optimize the oxygen storage capacity for a given size vessel.

Although controller 5 has been described as being independently responsive to a set point temperature as sensed by thermocouple 57 and the set point pressures, it is possible that controller 5 be programmed to activate heating elements 26 when the lower set point pressure were reached and to deactivate the heating elements 26 upon attaining the temperature set point. This would, however, be undesirable in that the temperature of oxygen separation elements 16 would cycle and such cycling could lead to enhanced failure rate of such elements.

A backup oxygen supply system is preferably provided to supply oxygen when the pressure at the outlet 42 falls below a predetermined level indicative of failure of apparatus 1. The backup supply system is provided with oxygen cylinder 80 for such purposes. The oxygen supplied from oxygen cylinder 80 is let down in pressure by a pressure regulator 82. An isolation valve 84 is provided so that it can be set in an open and closed positions for selectively supplying oxygen to the outlet 42 and a check valve 86 is provided to prevent the back flow of potentially impure gas from the user back to the oxygen cylinder 80 and the piping leading back to the oxygen cylinder 80. For example, assuming that pressure regulator 46 is set at 50 psig, pressure regulator 82 will be set slightly lower pressure, for example 40 psig. During normal operation, the check valve 86 will prevent back flow towards the oxygen cylinder 80. Upon a complete failure of apparatus 1 or upon failure of the apparatus 1 to meet sustained demand higher than that of apparatus 1, isolation valve 84 is set in an open position and oxygen will be supplied from oxygen cylinder 80 with check valve 47 preventing the flow of oxygen back to apparatus 1. Although not illustrated, isolation valve 84 could be controlled automatically with a pressure transducer located downstream of check valve 86 to set isolation valve to an open position when the pressure fell below a set point, for instance 50 psig.

Figure 2:
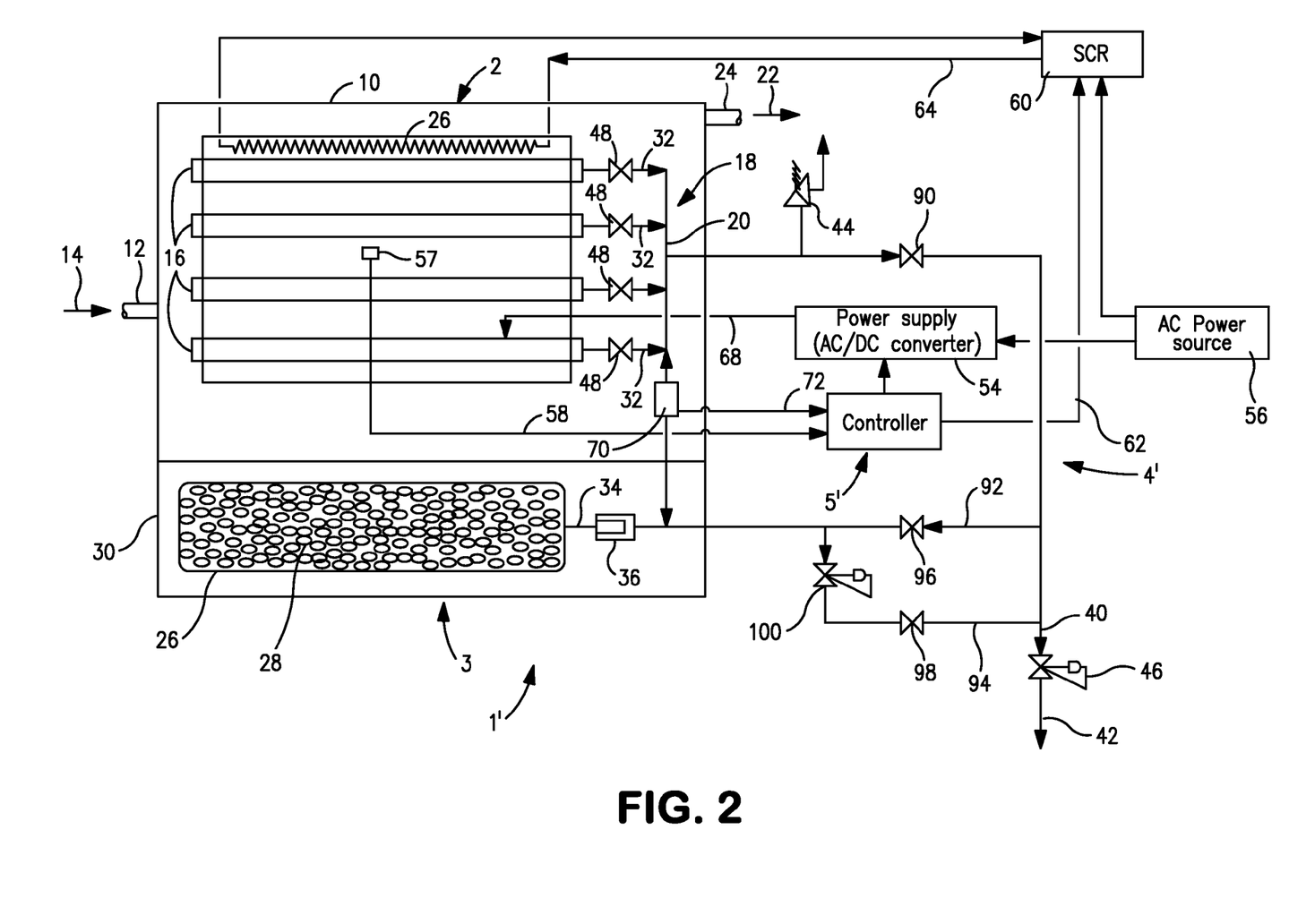
FIG. 2 is a schematic diagram of an apparatus for carrying out a method in accordance with another embodiment of the present invention.

With reference to FIG. 2, an Apparatus 1' is illustrated that is designed to operate in accordance with a cyclical demand. Apparatus 1' differs from apparatus 1 principally in the design of the flow network, which is designated in Apparatus 1' as flow network 4'. Flow network 18' has a first check valve 90 to prevent flow from the adsorbent bed 3 back to the electrically driven oxygen separation device 2. Additionally, flow network 4' also has two parallel, first and second flow paths 92 and 94. The first flow path 92, at one end, is in communication with the adsorbent bed 3 and the other end is in communication with the electrically driven oxygen separation device 2. A second check valve 96 is positioned within the first of the flow paths 92 to prevent flow within the first flow path 92 from the adsorbent bed 3 to the electrically driven oxygen separation device 2. The second of the two flow paths 94 has a third check valve 98 to prevent flow from the electrically driven oxygen separation device 2 to the adsorbent bed 3. Additionally, a pressure regulator 100 is positioned within the second of the flow paths 94 between the third check valve 98 and the adsorbent bed 3. The pressure regulator 100 is configured to reduce line pressure of the adsorbent bed oxygen stream from the adsorbent bed 3 to that of the electrically driven oxygen separation device 2.

Controller 5' is similar to controller 5 and provides control to the heating elements 26 in the same manner as controller 5. Controller 5' is provided with a pressure set point that is referable to a pressure that is indicative of the adsorbent bed 3 being fully loaded with oxygen, for example 250 psig as indicated above. During operation, where there is no demand and when the pressure sensed by pressure transducer 70 is below 250 psig, power supply 54 is activated by controller 5' to apply electrical power to electrically driven oxygen separation device 2. Oxygen within a separated oxygen stream then flows from the electrically driven oxygen separation device 2 through the first of the flow paths 92, with flow being prevented within the second of the flow paths 94 by the third check valve 98. When the set point pressure is reached, power supply 54 is deactivated. Back flow of oxygen from the adsorbent bed 3 to the now idle electrically driven oxygen separation device 2 is prevented by the first check valve 90. When a demand for oxygen exists, controller 5' activates power supply 54 to apply power to the electrically driven oxygen separation device 2 to produce a separated oxygen stream. At the same time, oxygen will be desorbed from the adsorbent bed 3 to produce an adsorbent bed oxygen stream. This stream will flow in the second of the flow paths 94 after having been reduced in pressure by pressure regulator 100 to match the pressure within the separated stream produced by the electrically driven oxygen separation device 2. Flow of the adsorbent bed oxygen stream is prevented within the first of the flow paths 92 by second check valve 96. The adsorbent bed oxygen stream is combined with the separated oxygen stream to produce a combined oxygen stream that is reduced in pressure by pressure regulator 46 and then discharged to the user through outlet 42. Although not illustrated, a backup oxygen supply, such as an oxygen cylinder 80 and its associated flow network could be provided.

Figure 3:
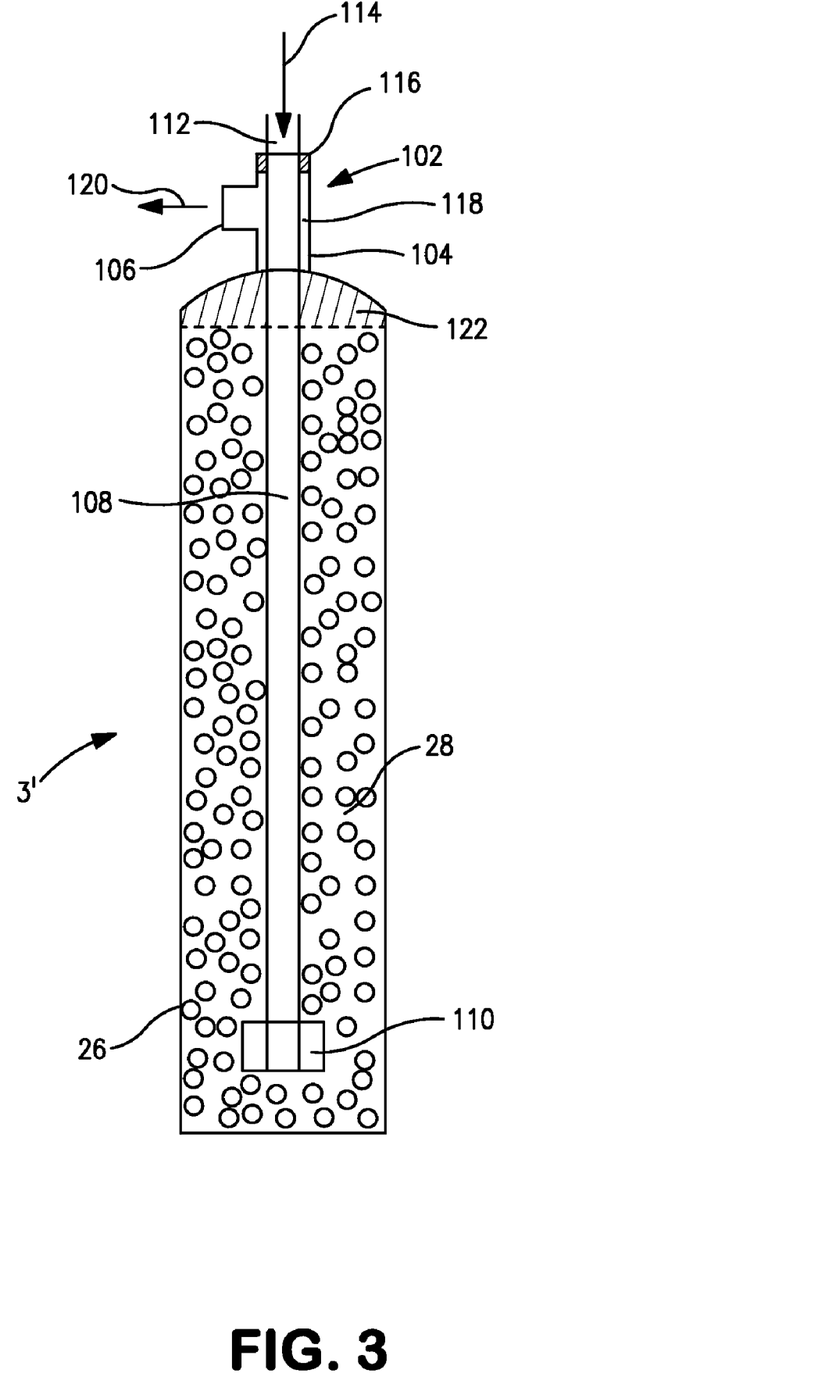
FIG. 3 is a schematic diagram of an adsorbent bed that can be used in connection with any embodiment of the present invention.

With reference to FIG. 3, a preferred adsorption bed 3' is illustrated that is particularly useful with the apparatus 1' shown in FIG. 2. Adsorption bed 3' is provided with an adsorbent vessel 26 containing an adsorbent 28. A piping tee 102 is provided having a base section 104 and a side opening 106. The base section 104 of piping tee 102 is connected to the adsorbent vessel 26 and a dip tube 108 extends through the base section 104 of the piping tee 102 into the adsorbent 28 and preferably terminates in a mud dauber 110 to prevent particles of the adsorbent 28 to be drawn into the dip tube 108. Dip tube 108 can be connected to the first of the flow paths 92 of Apparatus 1'. Although not illustrated, the dip tube 108 would be connected directly to or by means of a conduit to second check valve 96 at end 112 of dip tube 108 to allow the separated oxygen stream, designated by reference number 114 to pass into adsorbent vessel 26 through the dip tube 108. At the end 112 of dip tube 108, the base section 104 of the piping tee 102 is sealed around dip tube 108 by means of an annular element 116 welded about its outer periphery to the base section 104 and at its inner periphery, to the dip tube 108. This provides an annular space 118 within the piping tee 102 for adsorbent bed oxygen to flow out of the opening 106 of the piping tee 102 as the adsorbent bed oxygen stream, which is designated by reference number 120. Alternatively, a special bored-through fitting is used at the end 112 of dip tube 108 to seal the base section 104 of the piping tee 102. The dip tube runs through the bored-through fitting and inside the tee 102. When bored-through fitting is attached to the end 112 of piping tee 102, it seals the end 112 of piping tee 102. As such, the opening 106 of the piping tee 102 would be connected to the pressure regulator 100 shown in FIG. 2, either directly or indirectly by means of suitable piping. Glass wool 122 is preferably provided to prevent particles of the adsorbent from being discharged through opening 106. The advantage of the foregoing arrangement is to enhance purge effectiveness and thereby reduce purge time during initial start up. It is to be noted that adsorbent bed 3' could also be used with apparatus 1 shown in FIG. 1 with a slight modification to the flow network 4. Such modification would involve connecting the dip tube 108 to the conduit 20 of manifold 18 and separately connecting the opening 106 to outlet conduit 40. Further, adsorption bed 3' is also capable of being used in a manner in which flow direction is opposite to that described above in which adsorbent bed oxygen flows through the dip tube 108 and separated oxygen flow into the side opening 106 of piping tee 102 and through the annular space 118.

While the present invention has been described with reference to preferred embodiments, as will occur to those skilled in the art, numerous changes, additions and omissions can be made without departing from the spirit and scope of the present invention as set forth in the appended claims.

We claim:

1. A method of supplying oxygen to meet a user demand comprising:

separating the oxygen from air through oxygen ion transport within an electrically driven oxygen separation device to produce a separated oxygen stream;

storing at least part of the oxygen contained within the separated oxygen stream by introducing at least part of the separated oxygen stream into an adsorbent bed and storing the at least part of the oxygen within the adsorbent bed;

supplying the oxygen, during an initial period of supply of the oxygen, solely from the adsorbent bed by discharging an adsorbent bed oxygen stream from the adsorbent bed containing the oxygen previously stored within the adsorbent bed so that pressure within the adsorbent bed continually decreases;

during the initial period of the supply of the oxygen deactivating the electrically driven oxygen separation device so that the electrically driven oxygen separation device is in a deactivated state and is not producing the oxygen; and supplying the oxygen, at a subsequent period of the supply of the oxygen, commencing when the pressure within the adsorbent beds decreases to a lower predetermined pressure level, by activating the oxygen separation device to produce the separated oxygen stream; and during the subsequent period of the supply of the oxygen;

if the user demand is less than the rate at which the oxygen is able to be produced by the electrically driven oxen separation device, introducing a part of the separated oxygen stream into the adsorbent bed to store part of the oxygen contained in the separated oxygen stream and supplying a remaining part of the separated oxygen stream to the user to meet the user demand;

during introduction of the part of the separated oxygen stream into the adsorbent bed, the pressure within adsorbent bed continually increasing and when the pressure within the adsorbent bed increases to a higher predetermined pressure level that is higher than the lower predetermined pressure level, returning the oxygen separation device to the deactivated state;

if the user demand is substantially equal, to the rate at which the oxygen is produced by the electrically driven oxygen separation device, supplying the oxygen solely from the separated oxygen stream and not from the adsorbent bed oxygen stream an not from the adsorbent bed oxygen stream; and if the user demand is greater than the rate at which the oxygen is produced by the electrically driven oxygen separation device, supplying the oxygen from a combined stream, the combined stream formed from the adsorbent bed oxygen stream and all of the separated oxygen stream.

2. The method of claim 1, wherein if no user demand for the oxygen exists and the pressure within the adsorbent bed is at or below the lower predetermined pressure level, the electrically driven oxygen separation device is activated and all of the separated oxygen stream is introduced into the adsorbent bed until the higher predetermined pressure level is reached and the electrically driven oxygen separation device is returned to the deactivated state.

3. A method of supplying oxygen to meet a user demand, comprising:

separating the oxygen from air through oxygen ion transport within an electrically driven oxygen separation device to produce a separated oxygen stream;

storing the oxygen contained within the separated oxy en stream by introducing all of the separated oxygen stream into an adsorbent bed and subsequently discharging and adsorbent bed oxygen stream from the adsorbent bed;

the user demand alternating between periods in which no user demand exists and a user demand exists for the oxygen;

when no user demand exists and pressure within the adsorbent bed is below a predetermined level, activating the electrically driven oxygen separation device and introducing all of the separated oxygen stream into an adsorbent bed and adsorbing the oxygen contained within the separated oxygen stream within the adsorbent;

when pressure within the adsorbent bed reaches a predetermined level and no user demand exists, deactivating the electrical driven oxygen separation device; and when the user demand exists, activating the electrically driven oxygen separation device and supplying the oxygen to the user by reducing line pressure of the adsorbent bed oxygen stream and combing the adsorbent bed oxygen stream with all of the separated oxygen stream to form a combined stream and supplying the oxygen to the user from the combined stream.

4. The method of claim 1 or claim 3, wherein the electrically driven oxygen separation device and the adsorbent vessel are contained within a system to deliver the oxygen and oxygen is supplied by a back-up supply of the oxygen upon the system failing to meet user demand for the oxygen.

5. The method of claim 1 or claim 2 or claim 3, wherein oxygen pressure of the oxygen delivered to meet the user demand is regulated to a level below that of the adsorbent bed oxygen stream and the separated oxygen stream.

6. An apparatus for supplying oxygen to meet a user demand comprising an electrically driven oxygen separation device configured to separate the oxygen from air through oxygen ion transport and thereby to produce a separated oxygen stream;

an adsorbent bed containing an adsorbent;

a flow network connecting the electrically driven oxygen separation device to the adsorbent bed such that at least part of the separated oxygen stream is able to be introduced into the adsorbent bed and at least part of the oxygen contained in the separated oxygen stream is stored in the adsorbent bed; and the flow network having an outlet in flow communication with both the adsorbent bed and the electrically driven oxygen separation device such that the oxygen is able to be supplied from the outlet as a combined stream composed of at least a remaining part of the separated stream produced by the electrically driven oxygen separation device and an adsorbent bed stream produced from the oxygen previously stored in the adsorbent bed;

a control system, responsive to pressure within the adsorbent bed, configured such that when the pressure is at a lower pressure level, the electrically driven oxygen separation device is activated to produce the separated oxygen stream and when the pressure is at a higher pressure level, higher than the lower pressure level, the electrically driven oxygen separation device is deactivated and is in a deactivated state in which the separated oxygen stream is not produced; and the flow network having at least one check valve positioned to prevent flow from the adsorbent bed to the electrically driven oxygen separation device such that when the user demand exists, and the pressure is at the higher pressure level, the oxygen supplied to from the outlet consists solely of the adsorbent bed oxygen stream until the pressure within the adsorbent bed has decreased to the lower pressure level whereupon the electrically driven oxygen separation device is activated and thereafter: if the user demand is less than a flow rate of the separated oxygen stream, the oxygen supplied from the outlet consists of the remaining part of the separated oxygen stream and the part of the oxygen stream is supplied to the adsorbent bed; if user demand is equal to the flow rate of the separated oxygen stream, the oxygen supplied from the outlet consists of all of the separated oxygen stream; and if user demand is greater than the flow rate of the separated oxygen stream the oxygen supplied from the outlet consists of the combined stream.

7. An apparatus for supplying oxygen to meet a user demand comprising:

an electrically driven oxygen separation device configured to separate the oxygen from air through oxygen ion transport and thereby to produce a separated oxygen stream;

an adsorbent bed containing an adsorbent to discharge an adsorbent bed oxygen stream;

a control system is responsive to pressure within the adsorbent bed and is configured such that when the pressure is at a lower pressure level and no user demand exists, the electrically driven oxygen separation device is activated to produce the separated oxygen stream and when the pressure is at a higher pressure level, higher than the lower pressure level, and no user demand exists, the electrically driven oxygen separation, device is deactivated and is in a deactivated state in which the separated oxygen stream is not produced;

the flow network two parallel flow paths, a first check valve positioned between the two parallel flow paths and the adsorbent bed to prevent flow from the adsorbent bed to the electrically driven oxygen separation device, a second check valve and a third check valve;

one of the two parallel flow paths, at one end, in flow communication with the adsorbent bed and, at the other end, in flow communication with the electrically driven oxygen separation device and the other of the two parallel flow paths, at one end, in flow communication with the adsorbent bed and, at the other of the ends, in flow communication with the outlet and with the electrically driven oxygen separation device, the one of the two parallel flow paths having the second check valve positioned to prevent flow from the adsorbent bed to the electrically driven oxygen separation device and the other of the two flow paths having the third check valve positioned to prevent flow from the electrically driven oxygen separation device to the adsorbent bed such that when the electrically driven oxygen separation device is activated at the lower pressure level, the separated oxygen stream will flow to the adsorbent bed through the one of the two parallel flow paths;

the flow network also having a pressure regulator positioned within the other of the two parallel flow paths, between the third check valve and the adsorbent bed and configured to reduce line pressure of the adsorbent bed oxygen stream such that it is able to combine with the separated oxygen stream; and the control system configured to selectively activate the electrically driven oxygen separation device when the pressure is at the higher pressure level and a user demand exists such that the oxygen delivered from the outlet of the flow network consists of the combined stream consisting of adsorbent bed oxygen stream flowing through the other of the two flow paths to the outlet and the separated oxygen stream flowing from the electrically driven oxygen separation device to the outlet.

8. The apparatus of claim 6 or claim 7, wherein an outlet pressure regulator is connected to the outlet to regulate oxygen pressure of the oxygen delivered from the outlet to a level below that of the adsorbent bed oxygen stream and the separated oxygen stream.

9. The apparatus of claim 8, wherein a backup supply system having an oxygen cylinder is connected to the outlet, the backup supply system configured to deliver oxygen from the oxygen cylinder when the level of the oxygen pressure fails below a predetermined pressure level.

10. The apparatus of claim 6 or claim 7, wherein the adsorbent is a zeolite selected from the group comprising 5A, CaNaX, CaX, LiX or mixtures thereof.

11. The apparatus of claim 6 or claim 7, wherein:

the adsorbent bed has an adsorbent vessel containing the adsorbent, a piping tee having a base section attached to the adsorbent vessel, the base section of the piping tee having a side opening and an elongated dip tube extending through the base section into the adsorbent vessel such that an annular space is defined between the elongated dip tube and the base section, the annular space in communication with the side opening of the base section; and the dip tube and the side opening are connected to the flow network such that either the separated oxygen stream flows into the dip tube and the adsorbent vessel and the adsorbent bed oxygen stream flows through the annular space and out of the side opening into the flow network or the separated oxygen stream flows into the side opening, through the annular space and into the adsorbent bed and the adsorbent bed oxygen stream flows through the dip tube to the flow network.

* * * * *